April 13, 1948.    H. STEPHENSON    2,439,588
DIRECTION SIGNAL FOR MOTOR VEHICLES
Filed Nov. 23, 1946    2 Sheets-Sheet 1

INVENTOR
Hyrum Stephenson
BY
ATTORNEYS

April 13, 1948. H. STEPHENSON 2,439,588
DIRECTION SIGNAL FOR MOTOR VEHICLES
Filed Nov. 23, 1946 2 Sheets-Sheet 2
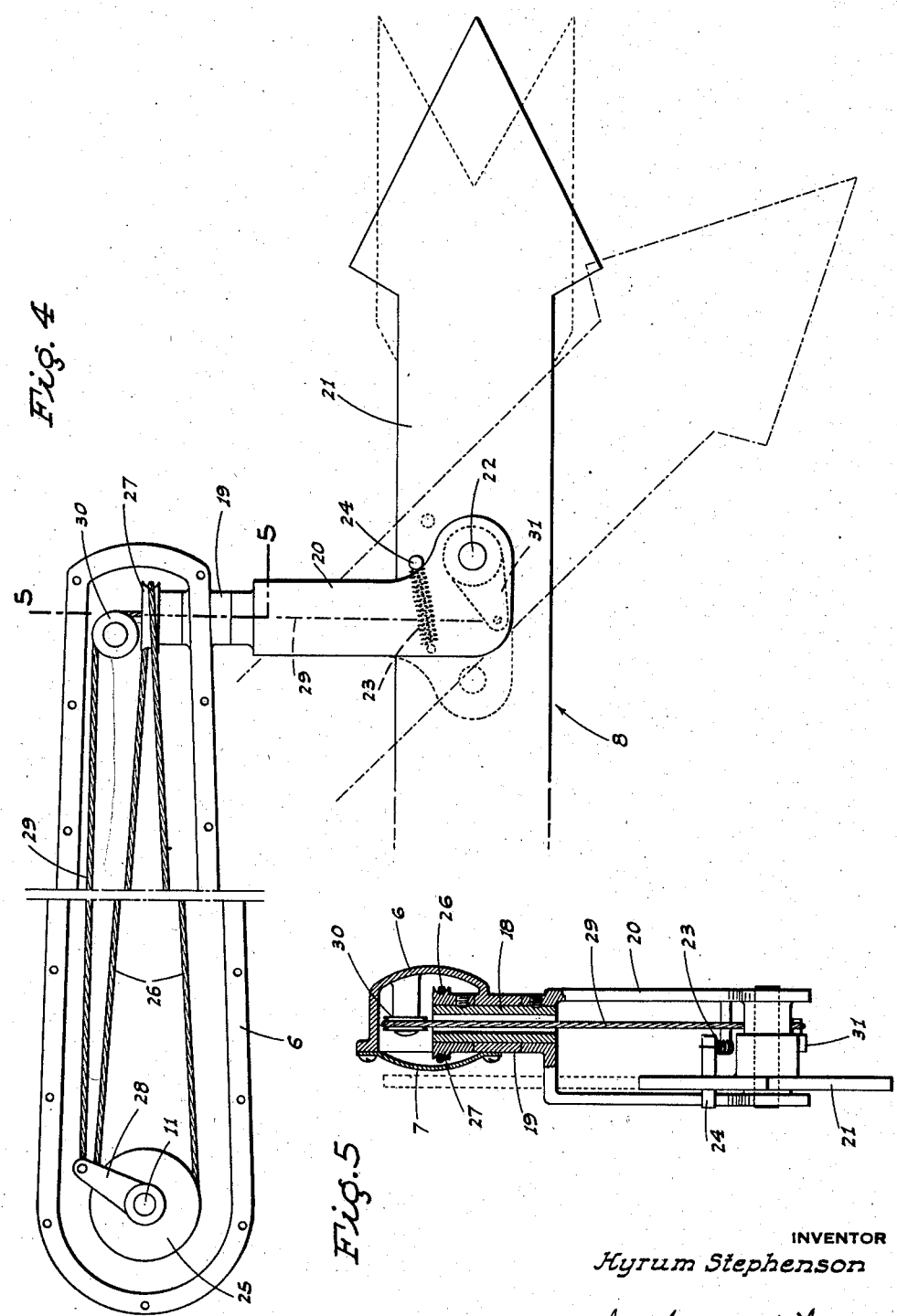
INVENTOR
Hyrum Stephenson
BY
ATTORNEYS Patented Apr. 13, 1948

2,439,588

UNITED STATES PATENT OFFICE 2,439,588

DIRECTION SIGNAL FOR MOTOR VEHICLES

Hyrum Stephenson, Tracy, Calif.

Application November 23, 1946, Serial No. 712,019

4 Claims. (Cl. 116—47)

This invention relates to, and it is an object to provide, a novel mechanical signal device for use on motor vehicles such as automobiles, and trucks; the device being operative, from within the driver's compartment, to give a right turn, left turn, or a stop signal, selectively.

Another object of the invention is to provide a mechanical signal device, for the purpose described, which includes a laterally projecting, hollow, supporting arm adapted to be mounted on the vehicle body exteriorly thereof, a movable signal assembly carried by the arm at its outer end in position to be readily seen by a following or approaching vehicle, and manually controlled mechanism extending from within the driver's compartment, and through the hollow arm to said signal assembly in actuating relation to the latter.

A further object of the invention is to provide a mechanical signal device, as in the preceding paragraph, in which the signal assembly comprises a rotatably mounted, vertical spindle forked at one end, a normally horizontal arrow pivotally mounted intermediate its ends in the fork for swinging or tilting motion from such horizontal position to a downwardly pointing, outwardly inclined position; said manually controlled mechanism being arranged to cause the spindle to rotate to point the horizontal arrow to right or left to indicate a corresponding turn or to tilt the arrow to its downwardly pointing, outwardly inclined position to indicate a stop.

A further object of the invention is to provide a practical and effective direction signal for motor vehicles, and one which will be exceedingly effective for the purpose for which it is designed.

These objects are accomplished by means of such structure and relative arrangement of parts as will fully appear by a perusal of the following specification and claims.

In the drawings:

Fig. 4 is an enlarged front elevation of the device, with the cover plate of the hollow supporting arm removed.

Fig. 5 is an enlarged cross section on line 5—5 of Fig. 4.

Figure 1:
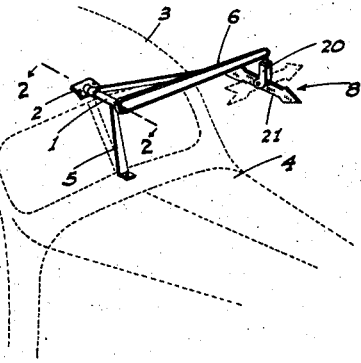
Fig. 1 is a perspective view of the device as mounted on an automobile.
Figure 2:
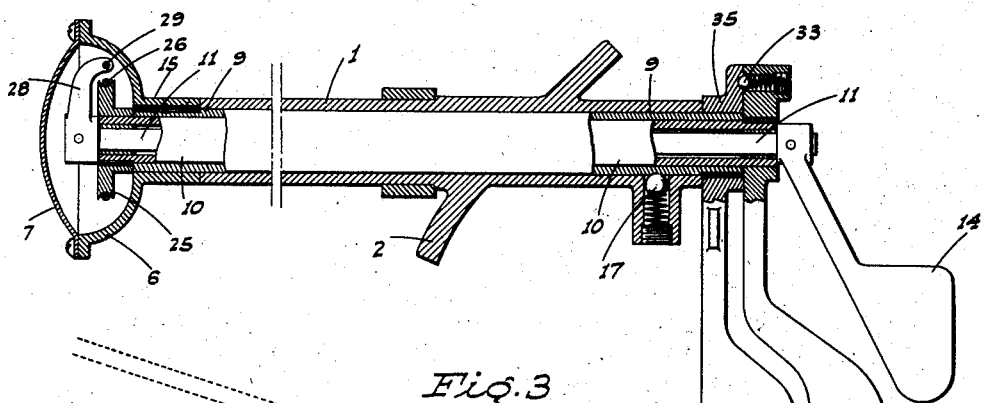
Fig. 2 is an enlarged fragmentary elevation, mainly in section, on line 2—2 of Fig. 1.

Referring now more particularly to the characters of reference on the drawings, the device comprises an elongated tubular body 1 formed, intermediate its ends, with a bracket 2; the body 1 being adapted to be mounted on the top 3 of an automobile 4 directly above and centrally of its windshield. The body 1 extends longitudinally in a horizontal plane, and the portion of said body rearwardly of the bracket 2 projects through a suitable bore in the auto top 3, and thus extends into the driver's compartment above the windshield. The bracket 2 is formed to matchingly engage the auto top 3 and is secured thereto by suitable means. The outer or projecting end of the body 1 is supported from the automobile body by means of a standard 5.

From the outer end of the tubular body 1 a hollow supporting arm 6 projects laterally in normal horizontal position to and beyond the left side of the automobile 4; such arm including a removable cover plate 7 for access to the working parts carried within said arm, as hereinafter described. The supporting arm 6 projects to and some distance beyond the left side of the automobile, and at its outer end said arm supports a signal device, indicated at 8.

Within the tubular body 1 it is fitted with an outer sleeve 9, an inner sleeve 10, and a central rod 11, all in relatively rotatable relation. At the inner end of the tubular body 1, and within the driver's compartment of the automobile, the outer sleeve 9 is fitted with a depending radial lever 12; the inner sleeve 10 is fitted with a depending radial lever 13; and the rod 11 is fitted with a depending radial lever 14. The levers 12, 13, and 14 are axially spaced apart, normally in alinement in a vertical plane, and are of progressively shorter length from the lever 12 to the lever 14, as shown, for ease of manual access.

Figure 3:
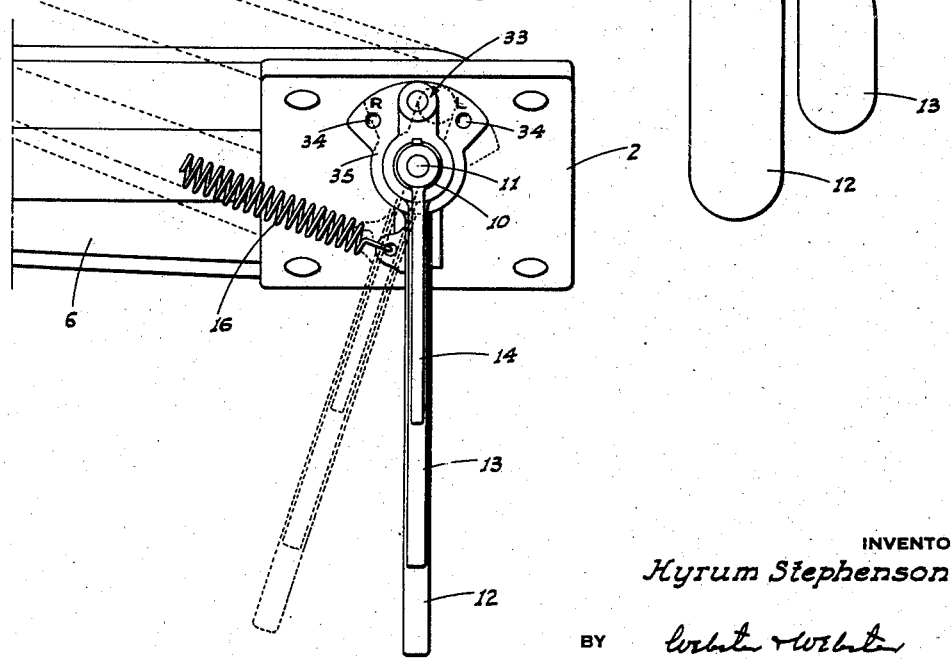
Fig. 3 is an enlarged fragmentary rear end view of the device detached, and showing particularly the radial control levers.

At the outer end of the tubular body 1, the outer sleeve 9 is keyed in connection with a hub 15 on the hollow supporting arm 6; whereby said arm is mounted for rotation with said sleeve 9. The radial lever 12, upon swinging from its full-line position of Fig. 3, to its dotted-line position, causes the supporting arm 6, together with the signal device 8, to be swung upward somewhat to the dotted line position of said figure, if necessary for the purpose of greater vision for the driver under abnormal driving conditions. Normally, however, the supporting arm 6 is in its horizontal position, as shown in Fig. 1. A counter-balance spring 16 connects between the radial lever 12 and a suitable point in the driver's compartment, and a spring-pressed detent 17 on the tubular body 1 cooperates with the outer sleeve 9 in holding relation to the latter, whereby to maintain the arm 6 in either of the selective positions of adjustment thereof.

The signal device, as indicated generally at 18, comprises the following structural arrangement:

A hollow spindle 18 projects vertically into the supporting arm 6, at its outer end and from below, through a bearing 19; said spindle being turnable in the bearing but maintained against axial displacement. Below the bearing 19 the hollow spindle 18 is formed with a fork 20, and an arrow 21, cut from metal or the like, extends through the fork in a normally horizontal, forwardly projecting position.

The arrow is pivoted, intermediate its ends, as at 22, in connection with the fork 20, with the axis of said pivot offset relative to the vertical axis of the hollow spindle 18.

A spring 23 is connected between the fork 20 and a stop pin 24 on the arrow; said spring and stop being arranged so that the spring urges the arrow upwardly at the point, while the stop pin 24 abuts the fork 20 to limit such upward movement to horizontal position of said arrow.

As so mounted the arrow 21 may be turned, upon rotation of the hollow spindle 18 in the bearing 19, to point to right or left to indicate a right or left turn, or may be swung or tilted from its normal horizontal position to a downwardly pointing, outwardly inclined position to indicate a stop. In Fig. 4 the arrow is shown in "right-turn" position in full lines; in "left-turn" position in dotted lines; and in "stop" position in broken lines.

The arrow 21 is actuated, so that it will assume said positions selectively, by means of the following manually controlled mechanism:

At its forward end the inner sleeve 10 is fitted with a pulley 25, and an endless cord 26 leads from the pulley 25 through the hollow arm 6 and about a cooperating pulley 27 on the upper end of the hollow spindle 18 within said arm.

With this arrangement right or left hand swinging of the radial lever 13 within the driver's compartment rotates the inner sleeve 10 and pulley 25, so that the endless cord 26 and pulley 27 correspondingly rotate the spindle 18 and the arrow 21 to position the latter properly for a right turn or left turn signal. In other words, the described mechanism swings the hollow spindle 18 through 90° to right or left at the selection of the operator; the arrow 21 normally pointing forwardly, as previously described.

The forward end of the rod 11 is fitted, within the arm 6, with a radial lever 28, and a cord 29 connects with the outer end of said lever and thence extends through the arm to adjacent the spindle 18, whence said cord turns over a direction-changing pulley 30 and depends through such spindle, and fork 20, to connection with the outer end of another radial lever 31 on the hub 32 of the arrow 21.

To swing the arrow to its stop position, as in broken lines in Fig. 4, the driver first manipulates the lever 13 until the spindle 18 is rotated to swing the arrow to its left-turn position. Then, with the arrow in such left-turn position, the radial lever 14 is actuated to swing the lever 28 in a direction to pull on the cord 29, causing the lever 31 to swing upwardly, and the arrow to swing downwardly to its "stop" position.

In order to assure that the radial lever 13 remain in its selective right or left-turn positions, said lever is formed with a spring-pressed detent 33 arranged to frictionally engage with corresponding sockets 34 formed in the adjacent hub 35 of the radial lever 12.

With the described vehicle signal device, "right-turn," "left-turn," or "stop" signals can be quickly and effectively given by the drive of the vehicle from within the operator's compartment, and by the simple manipulation of the levers 13 and 14 in the manner described. One great advantage of the device is that the signal can be given without the necessity of opening of any windows of the automobile, and further the signal is disposed in a position where it can be readily seen by the drivers of following approaching vehicles.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A mechanical signal device for vehicles comprising a supporting tubular body adapted to be mounted on a vehicle horizontally and lengthwise thereof with the rear end of said body in the driver's compartment, a supporting arm projecting laterally from the forward end of the tubular body, the arm being hollow, means mounting the arm on the body and in communication therewith, a pair of sleeves telescoped together and extending through the tubular body in rotatable relation to each other and said body, radial, axially, spaced levers on the inner ends of the sleeves within the driver's compartment, a vertical spindle rotatably journaled on the arm at its outer end and projecting thereinto, said spindle being hollow and communicating with the interior of the arm, a signal arrow pivoted on the spindle for vertical swinging motion, actuating connections in the arm between the forward end of one sleeve and the spindle arranged to rotate the spindle upon rotation of said one sleeve, and other actuating connections, in part in the arm and in part extending through the hollow spindle, connected between the forward end of the other sleeve and the signal arrow arranged to swing said signal arrow upon rotation of said other sleeve.

2. A mechanical signal device for vehicles comprising a supporting tubular body adapted to be mounted on a vehicle horizontally and lengthwise thereof with the rear end of said body in the driver's compartment, a supporting arm projecting laterally from the forward end of the tubular body, the arm being hollow, means mounting the arm on the body and in communication therewith, a pair of sleeves telescoped together and extending through the tubular body in rotatable relation to each other and said body, radial, axially, spaced levers on the inner ends of the sleeves within the driver's compartment, a vertical spindle rotatably journaled on the arm at its outer end and projecting thereinto, said spindle being hollow and communicating with the interior of the arm, a signal arrow pivoted on the spindle for vertical swinging motion, actuating connections in the arm between the forward end of one sleeve and the spindle arranged to rotate the spindle upon rotation of said one sleeve, and other actuating connections, in part in the arm and in part extending through the hollow spindle, connected between the forward end of the other sleeve and the signal arrow arranged to swing said signal arrow upon rotation of said other sleeve; said first named actuating connections comprising pulleys on said one sleeve and spindle in the arm, and an endless cord working between said pulleys.

3. A mechanical signal device for vehicles comprising a supporting tubular body adapted to be mounted on a vehicle horizontally and lengthwise thereof with the rear end of said body in the driver's compartment, a supporting arm projecting laterally from the forward end of the tubular body, the arm being hollow, means mounting the arm on the body and in communication therewith, a pair of sleeves telescoped together and extending through the tubular body in rotatable relation to each other and said body, radial, axially, spaced levers on the inner ends of the sleeves within the driver's compartment, a vertical spindle rotatably journaled on the arm at its outer end and projecting thereinto, said spindle being hollow and communicating with the interior of the arm, a signal arrow pivoted on the spindle for vertical swinging motion, actuating connections in the arm between the forward end of one sleeve and the spindle arranged to rotate the spindle upon rotation of said one sleeve, and other actuating connections, in part in the arm and in part extending through the hollow spindle, connected between the forward end of the other sleeve and the signal arrow arranged to swing said signal arrow upon rotation of said other sleeve; said other actuating connections comprising a radial lever on the forward end of said other sleeve, a direction-changing pulley in the arm adjacent the inner end of the hollow spindle, a pull cord connected to the radial arm and extending to and about the direction-changing pulley and thence through the hollow spindle to the signal arrow.

4. A mechanical signal device for vehicles, as in claim 3, wherein the spindle includes a fork, the signal arrow being pivoted in the fork, and a spring and stop unit arranged to urge the signal arrow to, and to maintain it in, a normal horizontal position; the pull cord being connected to said signal arrow in a manner to swing it to a downwardly pointing outwardly inclined position.

HYRUM STEPHENSON.

REFERENCES CITED

The following references are of record in the file of this patent:

UNITED STATES PATENTS

| Number | Name | Date |
| --- | --- | --- |
| 1,285,549 | Anthony | Nov. 19, 1918 |
| 1,292,855 | Newman | Jan. 28, 1919 |
| 1,406,290 | Schierding | Feb. 14, 1922 |
| 1,674,494 | Allard | June 19, 1928 |
| 1,682,643 | Varoutsos | Aug. 28, 1928 |
| 1,687,419 | Ainsa | Oct. 9, 1928 |